United States Patent [19]
Henderson

[11] Patent Number: 5,860,811
[45] Date of Patent: Jan. 19, 1999

[54] GEO-POSITIONAL TREADING SPHERE AND GEO-POSITIONAL TREADING SPHERE OPERATING SYSTEM

[76] Inventor: Gordon H Henderson, 5 Willedrop, apt. 2, Bloomington, Ill. 61701

[21] Appl. No.: 585,645

[22] Filed: Jan. 16, 1996

[51] Int. Cl.$^6$ .............................. G09B 19/00; A63G 31/16
[52] U.S. Cl. .............................. 434/255; 434/40; 434/55; 472/59; 482/51; 482/78
[58] Field of Search .................................. 434/29, 40, 51, 434/55, 255; 472/25, 26, 28, 47, 48, 130, 135; 482/52, 78, 51

[56] References Cited

U.S. PATENT DOCUMENTS

| | | | |
|---|---|---|---|
| 2,336,436 | 12/1943 | Beindorf | 434/40 |
| 2,344,454 | 3/1944 | Plotner | 434/55 |
| 3,135,057 | 6/1964 | Nelson et al. | 472/130 |
| 3,696,566 | 10/1972 | Langner | 52/81.1 |
| 4,439,157 | 3/1984 | Breglia et al. | 434/40 |
| 4,446,480 | 5/1984 | Breglia et al. | 434/40 |
| 4,599,645 | 7/1986 | Brown et al. | |
| 5,052,932 | 10/1991 | Trani | 434/29 |
| 5,062,624 | 11/1991 | Reed | 472/135 |
| 5,187,540 | 2/1993 | Morrison | |
| 5,236,196 | 8/1993 | Blankenburg et al. | 434/213 |
| 5,388,990 | 2/1995 | Beckman | |
| 5,422,715 | 6/1995 | Clarke | |
| 5,490,784 | 2/1996 | Carmein | 434/29 |
| 5,580,249 | 12/1996 | Jacobsen et al. | 434/255 |
| 5,655,909 | 8/1997 | Kitchen et al. | 434/44 |

*Primary Examiner*—Jerome W. Donnelly
*Assistant Examiner*—Victor K. Hwang
*Attorney, Agent, or Firm*—Michael I. Kroll

[57] ABSTRACT

The present invention relates to a geo-positional treading sphere (10) having a sphere (12) rotatably cradled within a base (14). The base (14) has at least one base pylon (14A) having a base pylon driver to rotate the sphere (12) longitudinally and/or latidudinally in response to an instant position which the user (16) is located within the sphere (12). The base (14) has a plurality of base bearings (14D) attached thereto which function to facilitate the sphere's (12) rotation. The user (16) adorns a user control (18) consisting of a user control backpack (18A) and a user control helmet (18B). The user control backpack (18A) has at least one user control backpack infrared distance sensor to send and receive signals to the inner wall of the sphere (12). The received signals by the at least one user control backpack infrared distance sensor is relayed to the geo-positional treading sphere operating system (110). The received signals by the at least one user control helmet beam is relayed to the geo-positional treading sphere operating system (110). The geo-positional treading sphere operating system (110) controls rotation of the sphere (12) in relation to the position of the user (16) therein.

10 Claims, 8 Drawing Sheets

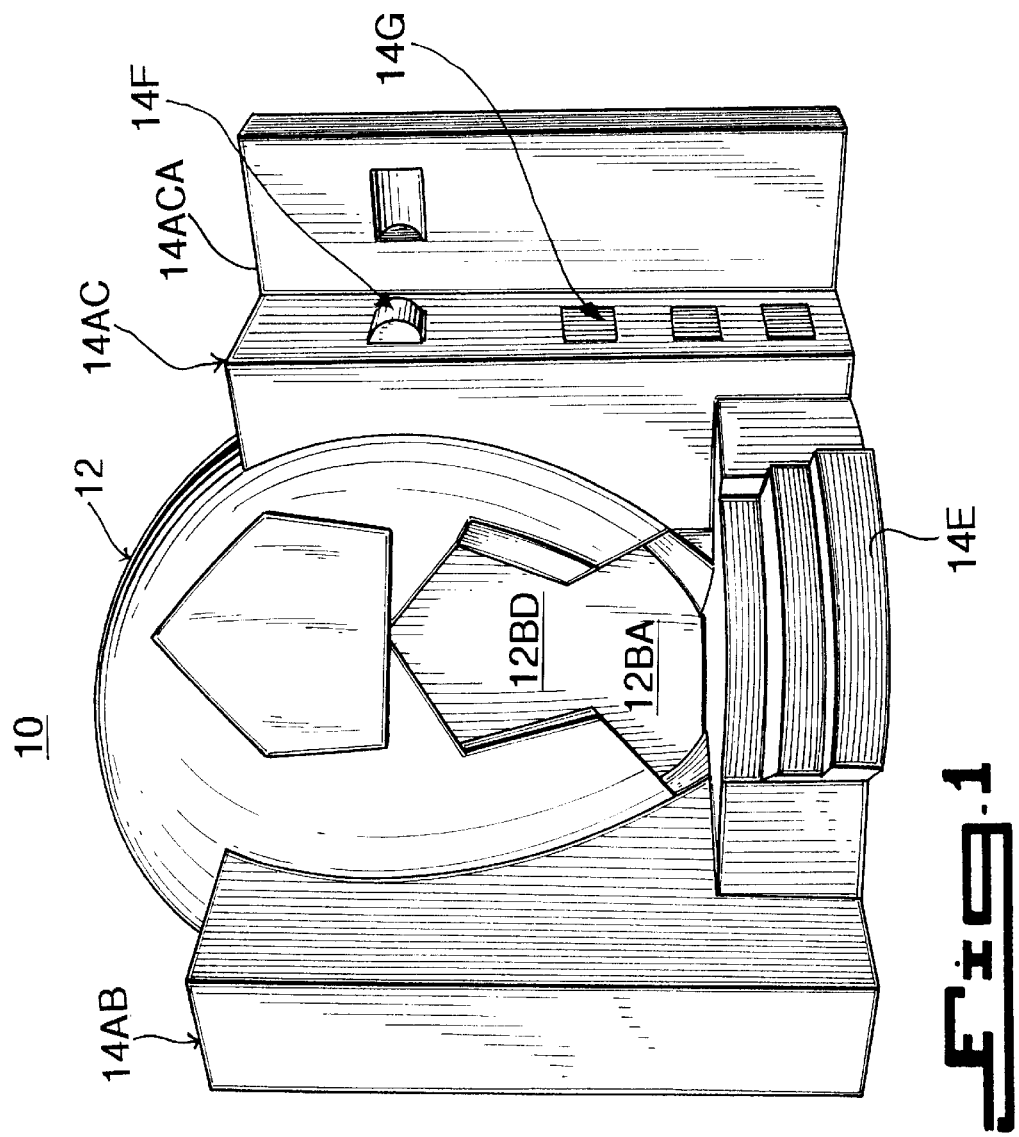

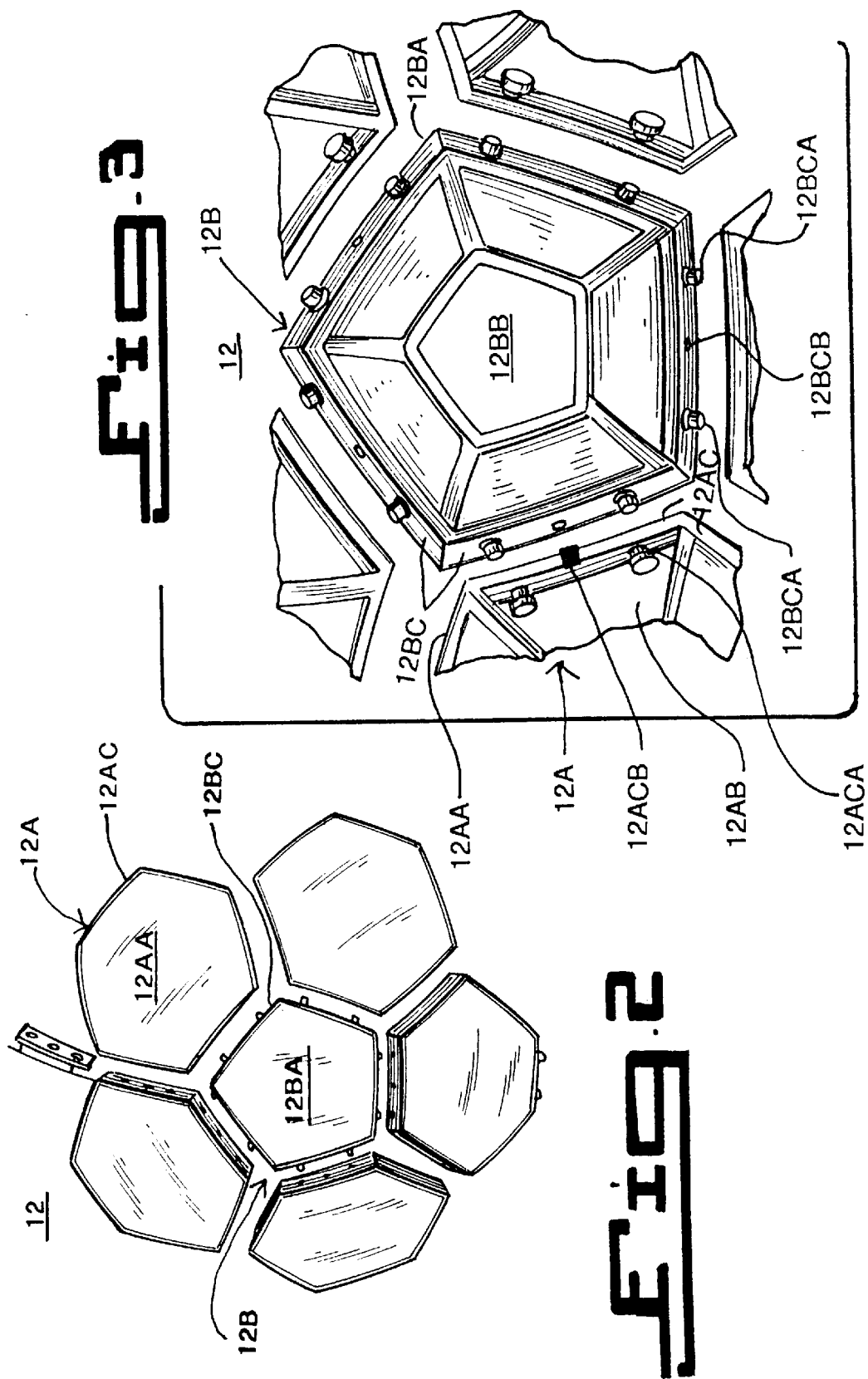

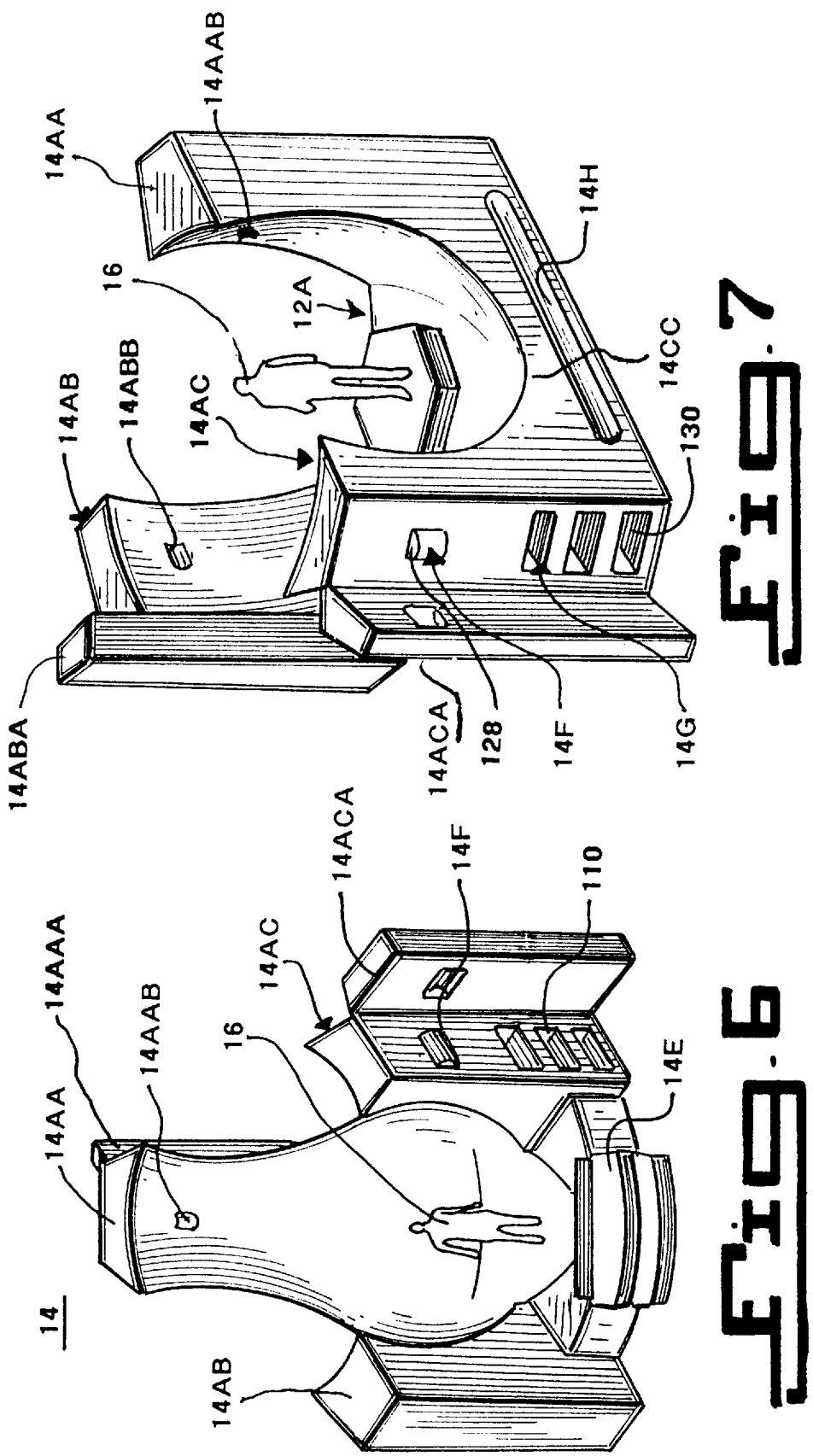

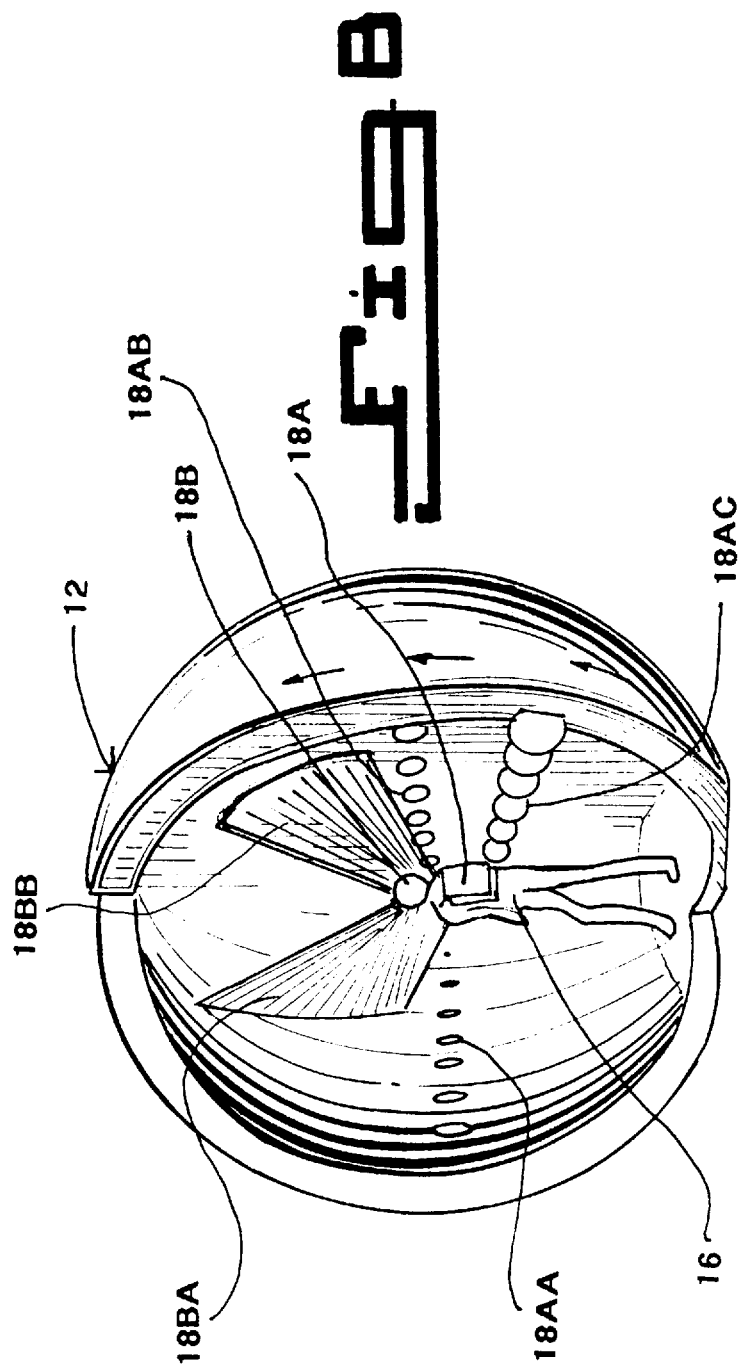

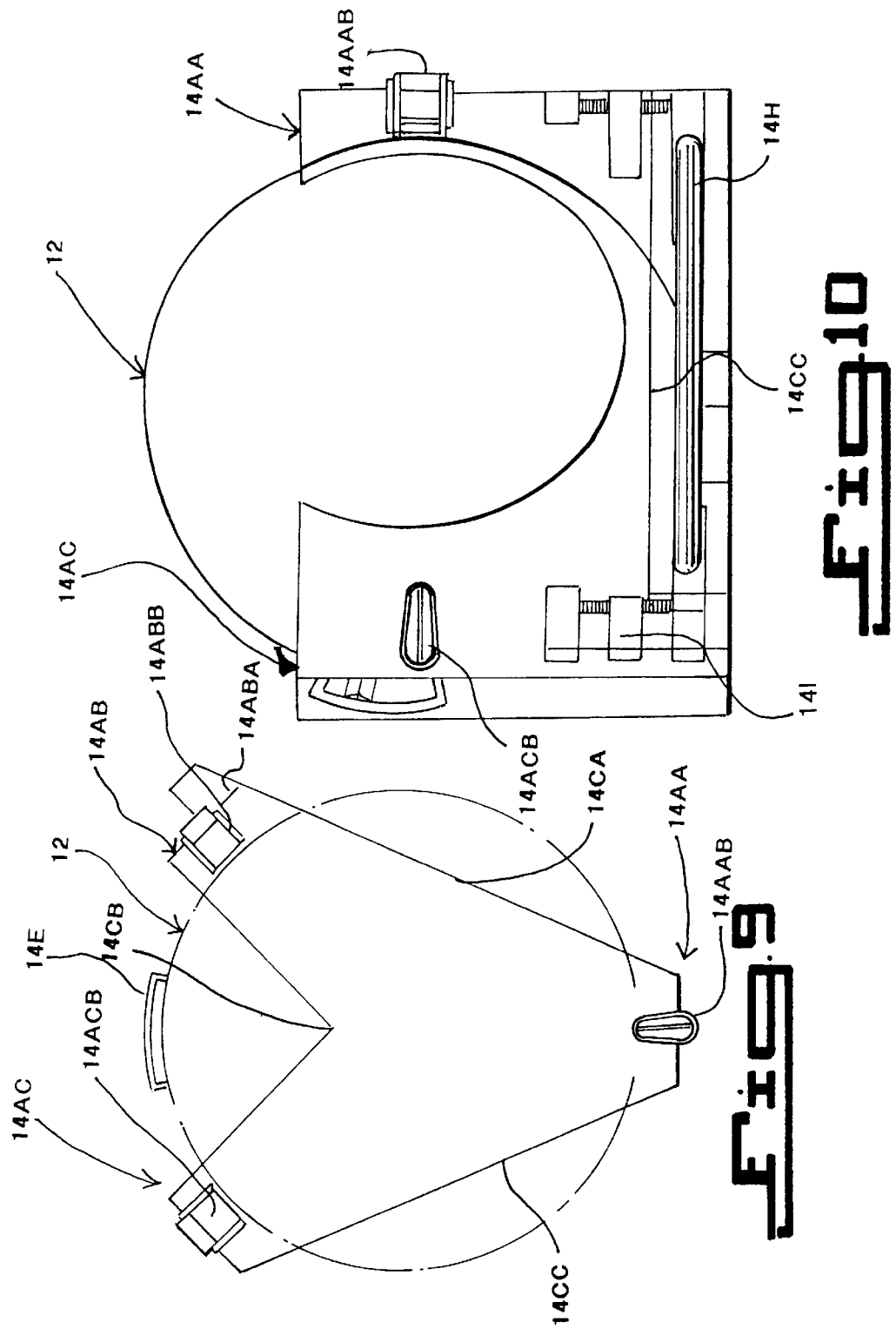

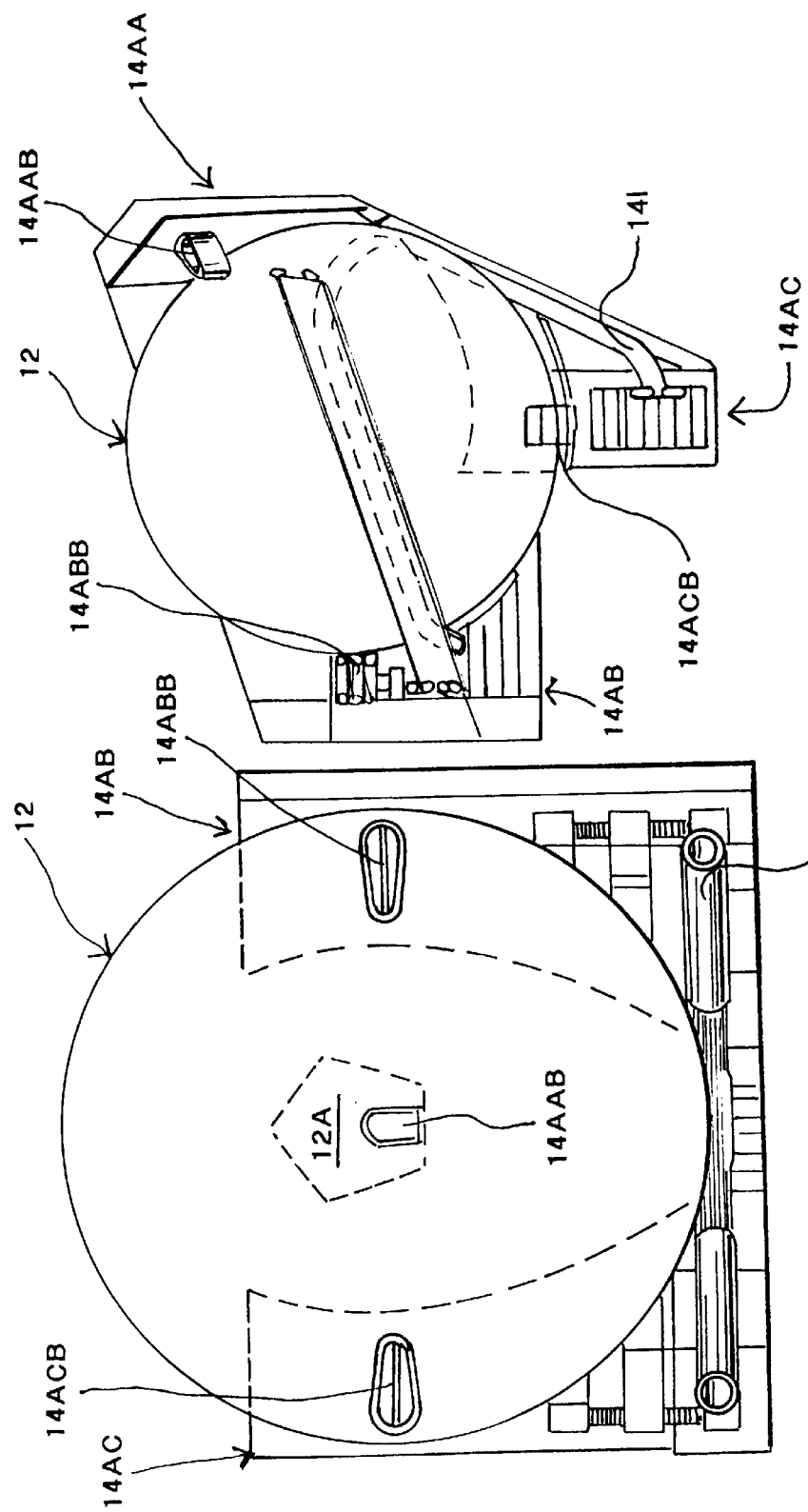

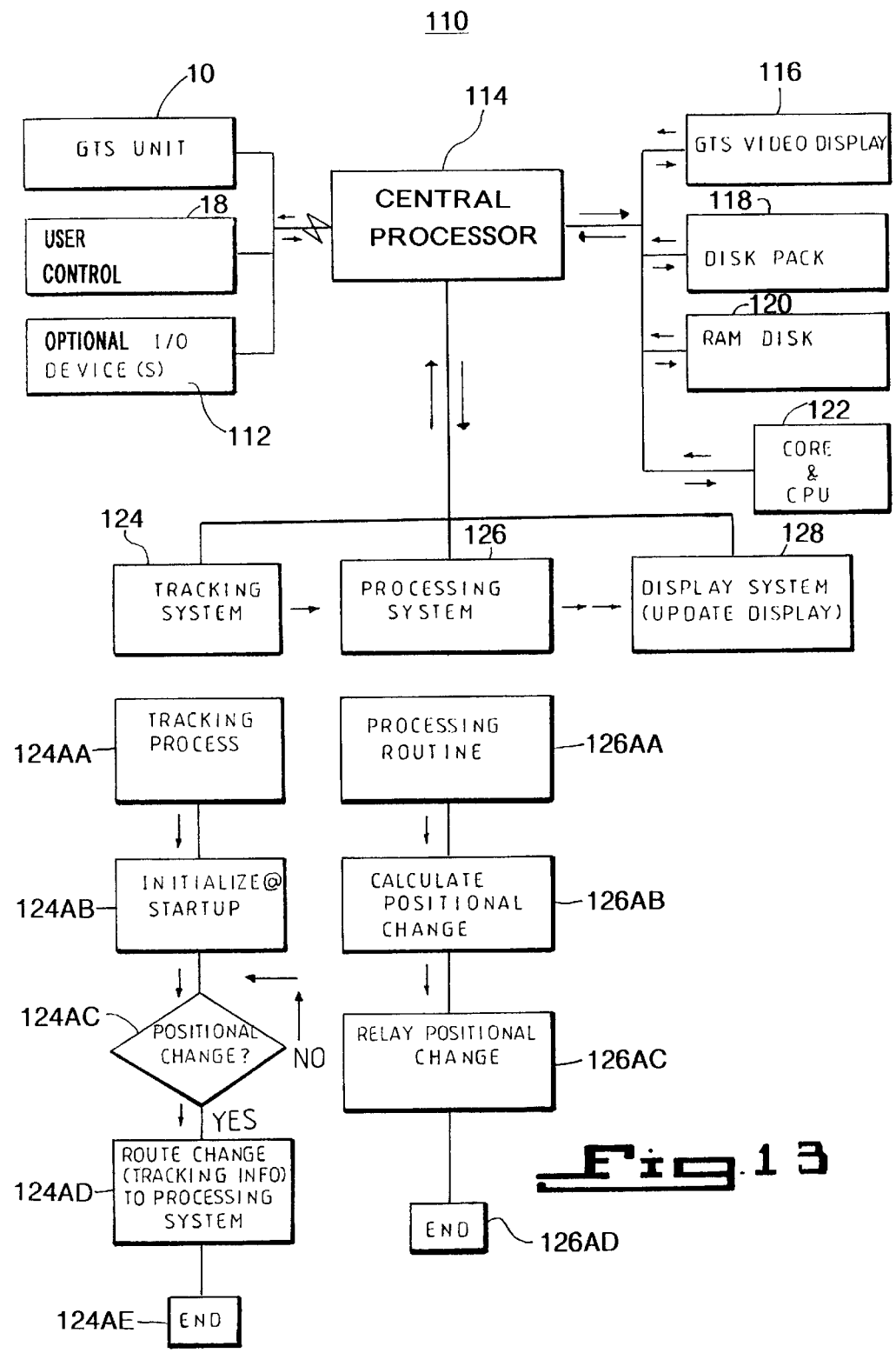

GEO-POSITIONAL TREADING SPHERE AND GEO-POSITIONAL TREADING SPHERE OPERATING SYSTEM

BACKGROUND OF THE INVENTION

1. Field of the Invention

The present invention relates to virtual reality apparatus. More particularly, the present invention relates to virtual reality apparatus having a geo-positional treading sphere and geo-positional treading sphere operating system.

2. Description of the Prior Art

During the last decade, virtual reality devices have increased in popularity. The prior virtual reality devices were solely head gear (helmet) and hand controls. Recently, configurations of equipment within which a user is positioned during the virtual reality experience have been devised. However, these configurations of equipment have been limited in movement to up, down and sideways movement. The present invention combines virtual reality with three-dimensional 3D geo-positional treading sphere operating system with functions to rotate a geo-positional treading sphere in both a longitudinal and latitudinal direction in response to movement of the user therein.

Numerous innovations for virtual reality devices have been provided in the prior art that are adapted to be used. Even though these innovations may be suitable for the specific individual purposes to which they address, they would not be suitable for the purposes of the present invention as heretofore described.

SUMMARY OF THE INVENTION

The GTS, or Geo-Positional Treading Sphere, is a dynamic, interactive, virtual reality simulator, enabling instant, real-time and true three-dimensional operations inside a spherical module calibrated to human scale. Taking the principle of a hamster in treadmill into the third dimension, the GTS allows for a variety of real-time, fully integrated human experience emulations with such wide ranging potential as to be virtually limitless. What follows is a general description and brief explanation of the concept for a global, real-time, three-dimensional virtual reality simulation unit.

The first and most obvious advantage of the GTS is that it represents a fundamental innovation that becomes the obvious and expedient standard for the next stage of virtual reality applications. The present invention has advantages such as personnel training, sports and physical therapy, telepresence via networks and robotics, and various kinds of simulations including recreational, educational, and military simulations. Low G-force simulations including driving, flying, and other simulations are facilitated through the use of optimal interchangeable carriage/cockpit/control pieces. The interchangeable cockpit piece replaces a single piece of the GTS.

The sphere is a double-walled geodesic structure composed of interlocking pentagonal and hexagonal waffle frames covered with interior surface panels. The interior diameter of the sphere is 4.0 meters, allowing comfortable movement for a large individual, whose head is positioned approximately at the center of the sphere. The thickness of the sandwich panels composing the sphere is 15 centimeters, giving an overall outside diameter of 4.3 meters. The waffle frames composing the sphere are preferably made of recycled molded plastic composite material, and are fastened with male-female type connectors around the perimeter of each frame. The interior surface panels are made from the same material, and snap onto the interior of each frame.

The Base consists of three L-shaped pylons, that are arranged in a wedge shape, so that two pylons form a 90 degree angle, the third bisecting the remaining 270 degrees, to create an optimally triangulated framework for containing the sphere. All three pylons meet at the center below the sphere, where they are held together by a cam type connector. The interior surfaces of the pylons are formed as spheroidal pendentives, providing the contact area against which the sphere is bearing at all times. All along their surfaces, these pendentives are fitted with bearings, against which the sphere performs its rotations. All components of the base are preferably made of the same recycled plastic composite material as the sphere, and the pylons are hollow, allowing ample room for hardware and control mechanisms, which are accessed by means of doors, drawers and removable panels.

The drive mechanism manipulates the treading sphere in response to input received from tracking systems that correspond to the user's movement inside the sphere. It consists of three drive wheels that are powered by high-torque motors, and which engage the sphere at its equator. There is one motor-drive wheel assembly in each of the three pylons of the base. Two of these are located in the pylons disposed at a 90 degree angle, and controls movement in the north-south and east-west directions. The third drive wheel rotates the sphere laterally, i.e. rotate it clockwise or counterclockwise. These mechanisms, working in combination, afford a full range of movement for the treading sphere, while the user's position can be located and tracked on a Cartesian coordinate system.

The tracking and relay system is located in a control pack that the user wears over his shoulders as he moves within the treading sphere. Inside the pack are infra-red distance sensors, disposed in all directions sending out high-speed signals that measure rate of acceleration and the user's distance from the interior surface of the sphere. A gyroscopic directional tracker located at the back of the control pack gives a continuous read-out of bearing and declination of the subject. As the user moves and turns within the treading sphere, the tracking sensors detect all variations in real time, relaying this data through a transmitter into the central processor, where all data is combined and reconfigured for implementation and corrective action. All processes are refreshed approximately 60 times per second, allowing for instantaneous response to the user's actions.

The GTS operating system is initially based on an SGI RX000 CPU and uses multi-processing to provide the power needed to coordinate all GTS systems. An external file server feeds environmental information and optional software enhancements into the central processor. The operating system receives data from the file server and from the tracking and relay systems inside the sphere, and combines and coordinates all data for output to the drive mechanisms and display systems for real-time implementation and corrective action. The run-time procedure begins when the user enters the GTS and puts on the control pack, head mounted display and any other input devices required. Once all equipment is securely in place, the user issues the 'start-up' command, causing the sphere to close and calibrate. The user is then presented with an operating menu which enables the running of applications. At the end of a session the user issues the 'EXIT' command, terminating input and display, and lining up the door mechanism for exiting the sphere.

The GTS Control System is the computer processing system that drives all GTS activity. The control system consists of the tracking, processing, and display subsystems.

The tracking system's purpose is to receive data from the GTS unit, tracking pack/suit, and optional I/O device(s) and detect any positional changes of the user. Once the trackdng system receives data that indicates a positional change by the user, the tracking system relays the new positional information to the processing system.

The processing system's job is to calculate the positional change, send the proper signals to the I/O devices and update the environmental information stored in memory. Signals get routed to the GTS unit, the tracking system, optional I/O devices, and the GTS video display (via the video display subsystem). The signals sent to the GTS unit drive the motors that move the sphere to the proper position on the grid coordinates while keeping the GTS user centered in the GTS unit.

The GTS video display subsystem calibrates the environmental display information for use in the GTS unit. The video subsystem is responsible for relaying the signals for projection onto the interior surface of the unit at a rate of 30 frames per second (60 fields per second) for use with standard shutter glass technology.

The types of problems encountered in the prior art are virtual reality devices do not interact physically with the user.

In the prior art, unsuccessful attempts to solve this problem were attempted namely: virtual reality devices which have limited up, down and sideways movement. However, the problem was solved by the present invention because it utilizes a 3D coordinate system with a geo-positional treading sphere operating system to rotate a geo-positional treading sphere within which a user is positioned.

Innovations within the prior art are rapidly being exploited in the field of virtual reality.

The present invention describes virtual reality devices with improved video displays, software and limited physical movement.

The present invention solved a long felt need to combine physical activity with vial reality.

The present invention produced unexpected results namely: the user receives a thorough workout concomitantly during the virtual reality experience.

A synergistic effect was produced utilizing the present invention due to the following facts and results from experimentation: a user's coordination increases with increased use of the geo-positional treading sphere.

Accordingly, it is an object of the present invention to provide a geo-positional treading sphere.

More particularly, it is an object of the present invention to provide a geo-positional treading sphere with a rotating sphere.

In keeping with these objects, and with others which will become apparent hereinafter, one feature of the present invention resides, briefly stated, in the sphere is composed of interlocking sphere hexagonal members and sphere pentagonal members.

When the sphere members are designed in accordance with the present invention, each has a sphere member outer surface, a sphere member inner surface, and sphere member sides.

In accordance with another feature of the present invention, the sphere member sides have a plurality of interspersed sphere member side male connectors and sphere member side female connectors.

Another feature of the present invention is that the sphere has an entrance consisting of a sphere hexagonal opening in conjunction with a sphere pentagonal opening.

Yet another feature of the present invention is that the geo-positional treading sphere has a base.

Still another feature of the present invention is that the base has at least one base pylon.

Yet still another feature of the present invention is that the base pylon has a base pylon door.

Still yet an other feature of the present invention is that base pylon has a base pylon driver.

Another feature of the present invention is that the base has a base bottom.

Yet another feature of the present invention is that the base bottom has a base first side, a base second side and a base third side.

Still another feature of the present invention is that two of the base sides are at a 90 degree angle to one another and the third base side is at a 270 degree angle.

Yet still another feature of the present invention is that the inner surface of the base has a plurality of base bearings mounted thereon.

Still yet another feature of the present invention is that each of the base bearings has a base bearing bottom with a base bearing bottom concave upon which a base bearing ball rotates and a base bearing top with a base bearing top concave upon which a base bearing ball rotates.

Another feature of the present invention is that the base has a base entrance which resembles stairs such that a user can gain access to the sphere.

Yet another feature of the present invention is that the base has a base display opening functioning to allow access to the base pylon driver powering mechanism.

Still another feature of the present invention is that the base has base display openings, base operating system openings, and base panel openings functioning to allow access to components of the geo-positional treading sphere operating system.

Yet still another feature of the present invention is that a user control is utilized by the user.

Still yet another feature of the present invention is that the user control consists of a user control backpack and a user control helmet.

Another feature of the present invention is that user control backpack has user control backpack infrared distance sensors.

Yet another feature of the present invention is that the user control helmet emits and receives user control helmet beams.

Still another feature of the present invention is that the geo-positional treading sphere operating system has optional I/O devices.

Yet still another feature of the present invention is that the geo-positional treading sphere operating system has a central processor.

Still yet another feature of the present invention is that the geo-positional treading sphere operating system has a geo-positional treading sphere video display.

Another feature of the present invention is that the geo-positional treading sphere operating system has a disk rack.

Yet another feature of the present invention is that the geo-positional treading sphere operating system has a RAM disk.

Still another feature of the present invention is that the geo-positional treading sphere operating system has a core and CPU.

Yet still another feature of the present invention is that the geo-positional treading sphere operating system has a tracking system.

Still yet another feature of the present invention is that the tracking system has a tracking system process.

Accordingly, it is a general object of the present invention to provide a tracking system process which has a tracking system tracking process.

It is a more particular object of the present invention to provide a tracking system process which has a tracking system initialize startup.

An object of the present invention is to provide a tracking system process which has a tracking system positional change.

A further object of the present invention is to provide a tracking system process which has a tracking system route change.

A still further object of the invention is to provide tracking system process which has a tracking system end controlled by a user.

Yet still another feature of the present invention is that the geo-positional treading sphere operating system has a processing system.

Still yet another feature of the present invention is that the processing system has a processing system process.

Accordingly, it is a general object of the present invention to provide a processing system process which has a processing system processing routine.

It is a more particular object of the present invention to provide a processing system process which has a processing system calculate positional change.

An object of the present invention is to provide a processing system process which has a processing system relay positional change.

A further object of the present invention is to provide a processing system process which has a processing system end controlled by a user.

Yet still another feature of the present invention is that the geo-positional treading sphere operating system has a display system.

Still another feature of the present invention is that the geo-positional treading sphere operating system has an external file server.

The novel features which are considered characteristic for the invention are set forth in the appended claims. The invention itself however, both as to its construction and its method of operation, together with additional objects and advantages thereof, will be best understood from the following description of the specific embodiments when read and understood in connection with the accompanying drawings.

BRIEF DESCRIPTION OF THE PREFERRED EMBODIMENT

FIG. 1 is a front perspective view of a geo-positional treading sphere exhibiting a sphere with a sphere rotatably cradled within a base. The sphere has a hexagonal opening and a sphere pentagonal opening through which a user enters the sphere from a base entrance.

FIG. 2 is an enlarged perspective view of the sphere exhibiting an exterior convexity which is a result of interlocking sphere hexagonal members and sphere pentagonal members having a convex sphere hexagonal member outer surface and a convex sphere pentagonal member outer surface, respectively.

FIG. 3 is an enlarged perspective view of the sphere exhibiting an interior concavity which is a result of interlocking sphere hexagonal members and sphere pentagonal members having a concave sphere hexagonal member inner surface and a concave sphere pentagonal member inner surface, respectively.

FIG. 6 is a top perspective view of a base exhibiting a user thereon and a base third pylon door in an open position.

FIG. 7 is a top perspective view of a base exhibiting a user thereon and a base third pylon door in an open position which further exhibits a base display housing and a base operating system housing therein.

FIG. 8 is a side partial cross sectional view of a sphere exhibiting a user wearing a user control backpack and a user control helmet.

FIG. 9 is a top view of a sphere rotatably cradled within a base which consists of a base first pylon having a base first pylon driver, a base second pylon having a base second pylon driver, and a base third pylon having a base third pylon driver. The base pylon drivers are specifically positioned to rotate the sphere latitudinally and longitudinally.

FIG. 10 is a side view of a sphere rotatably cradled within a base exhibiting the base pylon drivers being powered by base pylon driver powering mechanism which rotates the sphere upon a plurality of base bearings.

FIG. 11 is a side partial cross-sectional view of a sphere rotatably cradled within a base which consists of a base first pylon having a base first pylon driver, a base second pylon having a base second pylon, and a base third pylon having a base third pylon driver. The base pylon being powered by individual base pylon driver powering mechanisms rotate the sphere upon a plurality of base bearings.

FIG. 12 is a side partial cross-sectional view of a sphere rotatably cradled within a base exhibiting communication between individual base pylon driver powering mechanisms of the base pylon drivers.

FIG. 13 is a flow diagram of a geo-positional treading sphere operating system.

DETAILED DESCRIPTION OF THE PREFERRED EMBODIMENT

Figure 5:
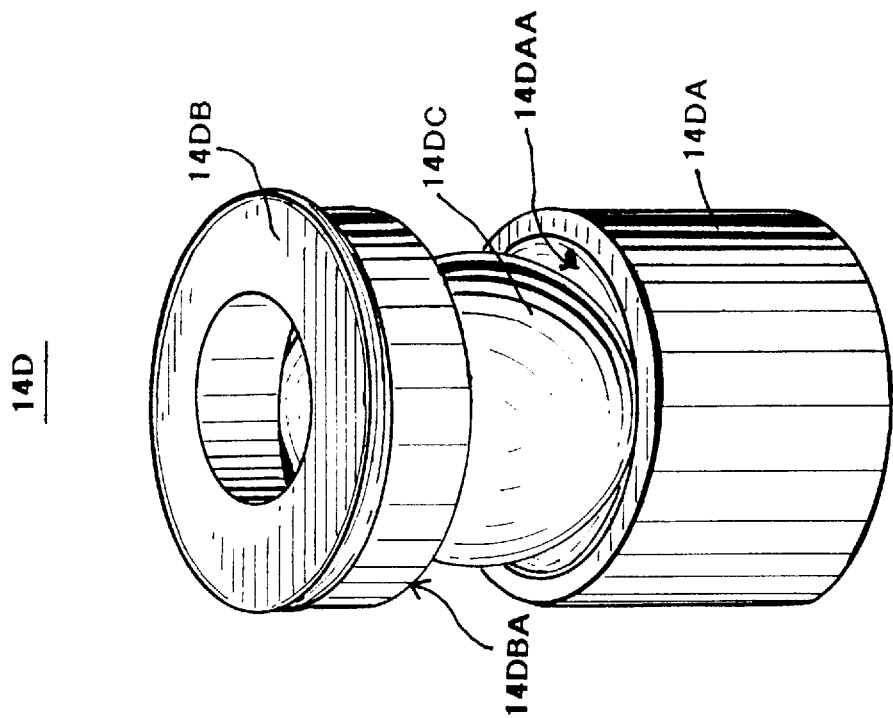
FIG. 5 is a top perspective enlarged view of a base bearing.

Firstly referring to FIG. 1 which is a front perspective view of a geo-positional treading sphere (10) exhibiting a sphere (12) with a sphere rotatably cradled within a base (14). The sphere (12) has a hexagonal opening (12AD) and a sphere pentagonal opening (12BD) through which a user (16) enters the sphere (12) from a base entrance (14E). The geo-positional treading sphere (10) is a dynamic, interactive, virtual reality simulator, enabling instant, real-time and true three-dimensional operations inside a sphere (12) which is a spherical module calibrated to human scale. Taking the principle of a hamster in a treadmill into the third dimension, the geo-positional treading sphere (10) allows for a variety of real-time, fully integrated human experience emulations with such wide ranging potential as to be virtually limitless.

The first and most obvious advantage of the geo-positional treading sphere (10) is that it represents a fundamental innovation that is an expedient standard for the next stage of virtual reality applications. The geo-positional treading sphere (10) has other advantages such as personnel training, sports and physical therapy, telepresence via networks and robotics, and various kinds of simulations including recreational, educational, and military simulations. Low G-force simulations including driving, flying, and other simulations will be facilitated through the use of optimal interchangeable spheres (12) which emulate carriage/cockpit/control pieces. The interchangeable sphere (12), cockpit piece, replaces a single piece of the geo-positional treading sphere (10).

Entrance to the geo-positional treading sphere (10) is facilitated by moving of one sphere hexagonal member (12A) and one adjacent (over or under) sphere pentagonal member (12B). The one sphere hexagonal member (12A) has one side being routed or beveled to accept a hinged mechanism that attaches the one sphere hexagonal member (12A) at that particular side which is adjacent to a side of the one sphere pentagonal member (12B). This configuration allows the one sphere hexagonal member (12A) and one adjacent (over or under) sphere pentagonal member (12B) to swing freely when not otherwise secured. The male/female connectors which are sphere hexagonal member side male connector (12ACA), sphere hexagonal member side female connector (12ACB), sphere pentagonal member side male connector (12BCA), and sphere pentagonal member side female connector (12BCB) used in construction of the sphere (12) are replaced by retractable posts (not shown) which resemble the original male/female connectors but permit the male connector to retract inwardly thus disengaging.

When the entrance to the sphere (12) is in a closed position after use, the one sphere hexagonal member (12A) is positioned at the direct bottom of the sphere (12) which has been aligned by the geo-positional treading sphere operating system (110) utilizing Cartesian coordinates. The user (16) stands on the one sphere hexagonal member (12A) as exhibited in FIG. 7. When the user (16) initiates an "EXIT" command, the internal posts (not shown) of both the one sphere hexagonal member (12A) and the one sphere pentagonal member (12B) are retracted inwardly. The user pushes the one sphere hexagonal member (12A) and the one sphere pentagonal member (12B) outwardly being hinged on a trailing side.

Now referring to FIG. 2 and FIG. 3. FIG. 2 is an enlarged perspective view of the sphere (12) exhibiting an exterior convexity which is a result of interlocking sphere hexagonal members (12A) and sphere pentagonal members (12B) having a convex sphere hexagonal member outer surface (12AA) and a convex sphere pentagonal member outer surface (12BA), respectively. Referring to FIG. 3 which is an enlarged perspective view of the sphere (12) exhibiting an interior concavity which is a result of interlocking sphere hexagonal members (12A) and sphere pentagonal members (12B) having a concave sphere hexagonal member inner surface (12AB) and a concave sphere pentagonal member inner surface (12BB), respectively.

The individual sphere hexagonal members (12A) have a plurality of sphere hexagonal member side male connectors (12ACA) and sphere hexagonal member side female connectors (12ACB) interspersed around a perimeter which are the sphere hexagonal member sides (12AC). The sphere pentagonal members (12B) have a plurality of a plurality of sphere pentagonal member side male connectors (12BCA) and sphere pentagonal member side female connectors (12BCB) interspersed around a perimeter which are the sphere pentagonal member sides (12BC). The sphere hexagonal member side male connectors (12ACA) are in a complimentary position to the sphere pentagonal member side female connectors (12BCB) and concurrently, the sphere pentagonal member side male connectors (12BCA) are in a complimentary position to the sphere hexagonal member side female connectors (12ACB).

The sphere (12) is a double-walled geodesic structure composed of interlocking sphere pentagonal members (12B) and sphere hexagonal members (12A) covered with concave interior sphere pentagonal member inner surface (12BB) and sphere hexagonal member inner surface (12AB), respectively, surface panels. The concave interior diameter of the sphere (12) is approximately 4.0 meters, providing comfortable movement for a large user (16), whose head is positioned at approximately at the center of the sphere (12). The thickness of the interlocking sphere pentagonal members (12B) and sphere hexagonal members (12A) composing the sphere (12) is approximately 15 centimeters, giving an overall outside diameter of the sphere (12) of approximately 4.3 meters. The interlocking sphere pentagonal members (12B) and sphere hexagonal members (12A) composing the sphere (12) are preferably made of recycled molded plastic composite material. However, the interlocking sphere pentagonal members (12B) and sphere hexagonal members (12A) can be manufactured from a group of materials consisting of plastic, plastic composites, metal, metal alloy, fiberglass, epoxy, carbon-graphite, rubber, rubber composites and wood. The interlocking sphere hexagonal members (12A) and sphere pentagonal members (12B) are fastened to one another with male-female type connectors which are sphere hexagonal member side male connectors (12ACA) and sphere hexagonal member side female connectors (12ACB) as well as sphere pentagonal member side male connectors (12BCA) and sphere pentagonal member side female connectors (12BCB), respectively. The sphere hexagonal member side male connectors (12ACA) and sphere hexagonal member side female connectors (12ACB) are interspersed on each sphere hexagonal member side (12AC). The sphere pentagonal member side male connectors (12BCA) and sphere pentagonal member side female connectors (12BCB) are interspersed on each sphere pentagonal member side (12BC). The sphere pentagonal member inner surface (12BB) and sphere hexagonal member inner surface (12AB) are made from the same material, and snap onto the interior of each interlocking sphere pentagonal members (12B) and sphere hexagonal members (12A), respectively.

Figure 4:
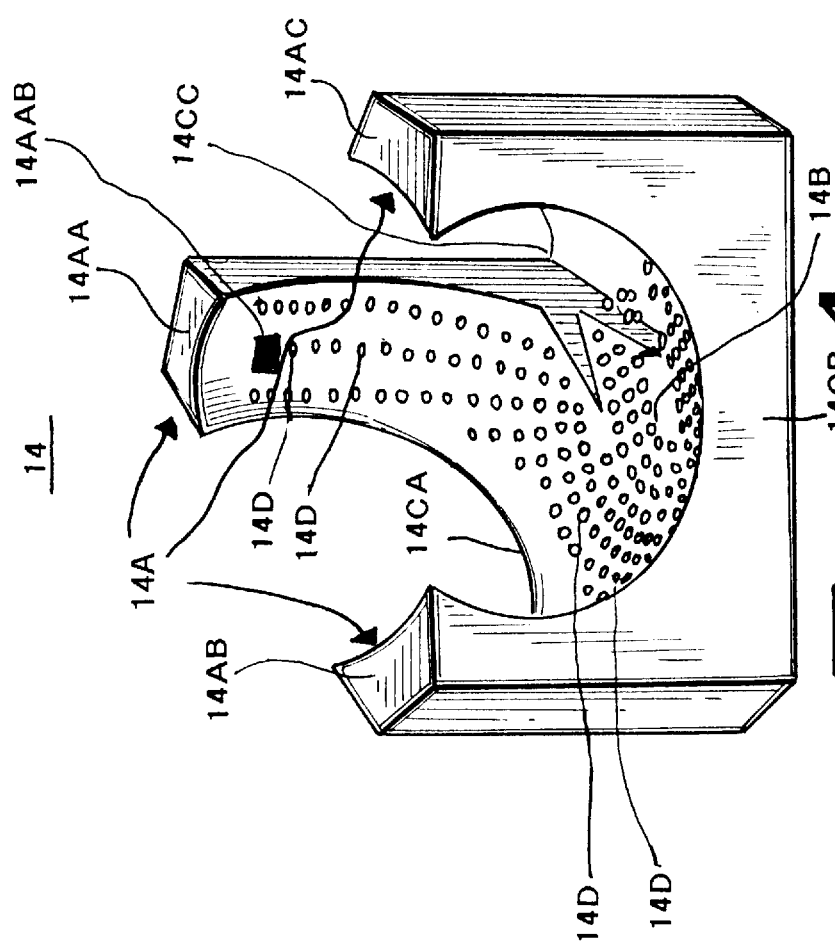
FIG. 4 is a top perspective view of a base exhibiting a plurality of base bearings thereon.

Referring to FIG. 4 which is a top perspective view of a base (14) exhibiting a plurality of base bearings (14D) thereon. The Base consists of three base pylons (14A) which are base first pylon (14AA), base second pylon (14AB), and base third pylon (14AC). The three base pylons (14A) are arranged in a wedge shape, such that base second pylon (14AB), and base third pylon (14AC) form a 90 degree angle, the base first pylon (14AA) bisecting the remaining 270 degrees, to create an optimally triangulated framework for containing the sphere (12). All three base pylons (14A) meet at the center, base bottom (14B), below the sphere (12), where they are held together by a cam type connector (not shown). The interior surfaces of the base pylons (14A) are formed as spheroidal pendentives, providing the contact area against which the sphere (12) is bearing at all times. All along the base pylons (14A) surfaces, these pendentives are fitted with a plurality of base bearings (14D), against which the sphere (12) performs its rotations. All components of the base (14) are preferably made of the same recycled plastic composite material as the sphere (12). However, the base (14) can be manufactured from a group of materials consisting of plastic, plastic composites, metal, metal allow, fiberglass, epoxy, carbon-graphite, rubber, rubber composites and wood. The base pylons (14A) are hollow, allowing ample room for base pylon driver powering mechanism (14I) and geo-positional treading sphere operating system (110), which are accessed by means of base display opening (14F), base operating system opening (140), and base panel opening (14H).

Referring to FIG. 5 which is a top perspective enlarged view of a base bearing (14D). The base bearing (14D) has a base bearing bottom (14DA) with a base bearing bottom concave (14DAA) on an inner side upon which a base bearing ball (14DC) freely rotates. The base bearing (14D) also has a base bearing top (14DB) with a base bearing top concave (14DBA) upon which the base bearing ball (14DC) freely rotates. The base bearing bottom (14DA) is securely affixed to an inner side of the base pylons (14A). The base bearing top (14DB) slidably contacts an outer surface of the sphere (12) during rotation.

Referring to FIG. 6 and FIG. 7 which are a top perspective view of abase (14) exibiting a user (16) thereon and a base third pylon door (14ACA) in an open position and a top perspective view of a base (14) exhibiting a user (16) thereon and a base third pylon door (14ACA) in an open position which further exhibits a base display housing (14F) and a base operating system housing (14G) therein, respectively. By opening the base third pylon door (14ACA) access to the base display opening (14F), base operating system opening (14G), geo-positional treading sphere operating system (110), display system (128), and external file server (130) is achieved. By removing a door (not shown) covering the base panel opening (14H), the base pylon driver powering mechanism (14I) is accessible.

Now referring to FIG. 8 which is a side partial cross sectional view of a sphere (12) exhibiting a user (16) wearing a user control backpack (18A) and a user control helmet (18B). The tracking system (124) relays information to a processing system (126). The tracking system (124) is located in a user control backpack (18A) that the user (16) wears over his shoulders as he moves within the sphere (12). Inside the user control backpack (18A) are infra-red distance sensors consisting of user control backpack first infrared distance sensor (18AA), user control backpack second infrared distance sensor (18AB), and user control backpack third infrared distance sensor (18AC), disposed in all directions sending out high-speed signals that measure rate of acceleration and the user's (16) distance from the interior surface of the sphere (12) at any point in time. A gyroscopic directional tracker (not shown) located at the back of the user control backpack (18A) gives a continuous read-out of bearing and declination of the user (16). As the user (16) moves and turns within the sphere (12), the backpack first infrared distance sensor (18AA), user control backpack second infrared distance sensor (18AB), and user control backpack third infrared distance sensor (18AC) detect all variations in real time, relaying this data through a transmitter (not shown) into the central processor (114), where all data is combined and reconfigured for implementation and corrective action in relation to rotation of the sphere (12). The processing system (126) refreshes information approximately 60 times per second, allowing for instantaneous response to the user's (16) actions.

Referring to FIG. 9 which is a top view of a sphere (12) rotatably cradled within a base (14) which consists of a base first pylon (14AA) having a base first pylon driver (14AAB), a base second pylon (14BA) having a base second pylon driver (14ABB), and abase third pylon (14AC) having a base third pylon driver (14ACB). The base pylon drivers (14AAB, 14ABB, 14ACB) are specifically positioned to rotate the sphere (12) latidunally and longitudinally. The base pylon driver powering mechanism (14I) manipulates the sphere (12) in response to input received from tracking systems that correspond to the user's (16) movement inside the sphere (12). The base pylon driver powering mechanism (14I) consists of three drive wheels which are base first pylon driver (14AAB), base second pylon driver (14ABB), and base third pylon driver (14ACB) that are powered by high-torque motors, and which engage the sphere (12) at its equator. Each of the base pylons (14A) have a repective motor-drive wheel assembly therein. The base first pylon (14AA) has a base first pylon driver (14AAB) contained therein. The base second pylon (14AB) has a base second pylon driver (14ABB) contained therein. The base third pylon (14AC) has a base third pylon driver (14ACB) contained therein. The base second pylon (14AB) and the base third pylon (14AC) disposed at a 90 degree angle, and control movement in a clockwise or counter clockwise latitudinal direction (i.e. East or West). The base first pylon driver (14AAB) contained within the base first pylon (14AA) rotates the sphere longitudinally in a front or rear rotational direction (i.e. North or South). The individual base pylon driver powering mechanism (14I), working in combination thereby communicating with one another through the central processor (114) affords a full range of movement for the sphere (12), while the user's (16) position can be located and tracked on a Cartesian coordinate system which is engineered within the central processor (114).

Referring to FIG. 10, FIG. 11, and FIG. 12 which are a side view, a side partial cross-sectional view, and a side partial cross-sectional view, respectively, of a sphere (12) rotatably cradled within a base (14) exhibiting the base pylon drivers (14AAB, 14ABB,14ACB) being powered by base pylon driver powering mechanism (14I) which rotates the sphere (12) upon a plurality of base bearings (14D). The base pylon driver powering mechanism (14I) communicates rotational commands from the geo-positional treading sphere operating system (110) to the base pylon drivers (14AAB, 14ABB,14ACB). FIG. 11 is a side partial cross-sectional view of a sphere (12) rotatably cradled within a base (14) which consists of a base first pylon (14AA) having a base first pylon driver (14AAB), a base second pylon (14BA) having a base second pylon driver (14ABB), and a base third pylon (14AC) having a base third pylon driver (14ACB).The base pylon drivers (14AAB, 14ABB, 14ACB) being powered by individual base pylon driver powering mechanisms (14I) rotate the sphere (12) upon a plurality of base bearings (14D). FIG. 12 is a side partial cross-sectional view of a sphere (12) rotatably cradled within a base (14) exhibiting communication between individual base pylon driver powering mechanisms (14I) of the base pylon drivers (4AAB, 14ABB, 14ACB). The rotation of the sphere (12) is controlled by the geo-positional treading sphere operating system (110) which yields commands to rotate the sphere (12) in response to a user's (16) position therein.

Lastly, referring to FIG. 13 which is a flow diagram of a geo-positional treading sphere operating system (110).

The geo-positional treading sphere operating system (110) is initially based on a core and CPU (122) which is preferably a SGI RXOOO and uses multiple processing systems (126) to provide the control required to coordinate all variables which effect the geo-positional treading sphere (10). An external file server (130) feeds environmental information and optional software enhancements into the central processor (114). The geo-positional treading sphere operating system (110) receives data from the external file server (130) and from the tracking system (124) with its corresponding relay system inside the sphere (12), and combines and coordinates all data for output to the base pylon driver powering mechanisms (14I) and display system (128) for real-time implementation and corrective action (rotation) of the sphere (12) in response to the movement of the user (16) therein. The run-time procedure begins when the user (16) enters the sphere (12) and puts on the user control backpack (18A),user control helmet (18B) and any other optional I/O device (112) required. Once all equipment is securely in place upon the user (16), the user (16) issues the "START UP" command, causing the sphere hexagonal opening (12AD) and sphere pentagonal opening (12BD) to close and calibrate. The user (16) is then presented with an operating menu (not shown) which enables the running of applications within the geo-positional treading sphere operating system (110). At the end of a session the user (16) issues the "EXIT" command, terminating the tracking system (124), processing system (126) and display system (128) as well as positioning the the sphere hexagonal opening (12AD) and sphere pentagonal opening (12BD) to open for the user (16) to exit the sphere (12).

The geo-positional treading sphere operating system (102) is the processing system (126) that drives all geo-positional treading sphere (10) activity. The geo-positional treading sphere operating system (110) consists of the tracking system (124), processing system (126), and display system (128).

The tracking system (124) functions to receive data from the user control backpack (18A),user control helmet (18B), and any optional I/O devices (112) and detect any positional changes of the user (16). Once the tracking system (124) receives data that indicates a positional change by the user(16), the tracking system (124) relays the new positional information to the processing system (126).

The processing system (126) functions to calculate the positional change of the user (16), sending proper signals and information to the optional I/O devices (112) and updating the environmental information received from the external file server (130) stored in memory of the RAM disk (120) and the core and CPU (122). Signals get routed to the geo-positional treading sphere (10), the tracking system (124), optional I/O device (112), and the display system (128). The signals sent to the geo-positional treading sphere (10) via the base first pylon driver (14AAB), base second pylon driver (14ABB) and the base third pylon driver (14ACB)which in turn rotate the sphere (12) to the proper position on the Cartesian grid coordinates while maintaining the user (116) centered within the sphere (12).

The display system (128) calibrates the environmental display information from the external file server (130) for use in the geo-positional treading sphere operating system (110). The display system (128) is responsible for relaying the signals for projection onto the interior surface of the sphere (12) at a rate of approximately 30 frames per second (60 fields per second) for use with standard shutter glass technology.

The tracking system (124) comprises a tracking system process consisting of the following steps:

A) commencing a tracking system tracking process (124AA) by activating a tracking system initialize startup (124AB) command by a user (16) when the user (16) is in position within the sphere (12);

B) monitoring tracking system positional change (124AC) of the user (16) from communication between a user control backpack (18A) which comprises a user control backpack first infrared distance sensor (18AA), a user control backpack second infrared distance sensor (18AB), and a user control backpack third infrared distance sensor (18AC), the user control backpack infrared distance sensors (18AA, 18AB, 18AC) sending signals from the user control backpack (18A) to an interior surface of the sphere (12) and receiving the signal therefrom and user control helmet (18B) which comprises a user control helmet first beam (18BA) and a user control helmet second beam (18BB), the user control helmet beams (18BA, 18BB) sending signals from the user control helmet (18B) to the an interior surface of the sphere (12) and receiving the signal therefrom;

C) relaying the tracking system route change (124AD) which consists of the received signals of the user control backpack infrared distance sensors (18AA, 18AB, 18AC) and the user control helmet beams (18BA, 18BB) from the interior surface of the sphere (12) to a processing system (126); and D) terminating the tracking system (124) by a user by entering a tracking system
end (124AE) command.

The processing system (126) comprises a processing system process consisting of the following steps:

A) commencing a processing system processing routine (126AA) by activating a processing system calculate positional change (126AB) when the processing system (126) receives the relayed tracking system route change (124AD) from the tracking system (124);

B) relaying processing system relay positional change (126AC) from the processing system calculate positional change (126AB) to a display system (128);

C) sending information from the display system (128) to a central processor (114); and D) terminating the processing system (126) by a user by entering a processing system end (126AD) command.

The geo-positional treading sphere operating system (110) comprises a process consisting of the following steps:

A) receiving information from the display system (128);

B) receiving information from the geo-positional treading sphere (10);

C) receiving information from the user control (18);

D) receiving information from the optional I/O devices (112);

E) receiving information from the geo-positional treading sphere video display (116);

F) receiving information from the disk rack (118);

G) receiving information from the RAM disk (120);

H) receiving information from the core and CPU (122);

I) analyzing the information received by the central processor (114);

J) transmitting information to the display system (128);

K) transmitting information to the geo-positional treading sphere (10);

L) transmitting information to the user control (18);

M) transmitting information to the optional I/O devices (112);

N) transmitting information to the geo-positional treading sphere video display (116);

O) transmitting information to the disk rack (118);

P) transmitting information to the RAM disk (120);

Q) transmitting information to the core and CPU (122); and

S) transmitting information to abase pylon driver powering mechanism (14I), the base pylon driver powering mechanism (14I) communicating the information from the central processor (114) to each individual base pylon driver (14AAB, 14ABB, 14ACB) which in turn rotates the sphere (12) into a position where the user (16) remains centered therein.

It will be understood that each of the elements described above, or two or more together, may also find a useful application in other types of constructions differing from the type described above.

While the invention has been illustrated and described as embodied in a geo-positional treading sphere, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A geo-positional treading sphere comprising:
   a) a sphere having an interior bottom surface and an opening entrance through which a user enters and stands completely unrestrained to move about within said sphere and to actively move across the interior bottom surface of said sphere;
   b) base means for rotatably cradling said sphere, said base means having spaced pylons for engaging said sphere and rotating said sphere both latitudinally and longitudinally;
   c) means removably mounted to the user for issuing signals for tracking the movement of the user within said sphere; and
   d) geo-positional treading sphere operating means for receiving said signals from said signal issuing means removably mounted to the user for processing said signals and transmitting processed signals to said pylons for rotating said sphere for maintaining the user standing on the interior bottom surface of said sphere as said sphere is rotated.

2. The geo-positional treading sphere as described in claim 1 wherein said sphere consists of a plurality of interlocking hexagonal and pentagonal members.

3. The geo-positional treading sphere as described in claim 2 wherein the entrance of said sphere consists of a disengagable hexagonal member resulting in a hexagonal opening and a disengagable pentagonal member resulting in a pentagonal opening.

4. The geo-positional treading sphere as described in claim 3 wherein said base means has three spaced pylons with two of said pylons being spaced apart at an angle of 90 degrees and the third pylon bisecting the remaining 270 degrees.

5. The geo-positional treading sphere as described in claim 1 wherein said base means further comprises a plurality of base bearings positioned on an interior surface upon which said sphere freely rotates.

6. The geo-positional treading sphere as described in claim 1 wherein one of said pylons further comprises a base display opening and a base operating system opening within which the geo-positional treading sphere operating means is located.

7. The geo-positional treading sphere as described in claim 1 wherein said means mounted on the user is a backpack.

8. The geo-positional treading sphere as described in claim 7 wherein said backpack contains an infrared distance sensor.

9. The geo-positional treading sphere as described in claim 8 wherein each of said pylons includes a wheel for engaging said sphere along the equator thereof for rotating said sphere both latitudinally and longitudinally.

10. The method of subjecting a user to virtual reality comprising the steps of:
   A) a user entering a sphere through an opening entrance and standing completely unrestrained to move about and across an interior bottom surface within said sphere,
   said sphere being rotatably cradled in base means having spaced pylons for engaging said sphere and being capable of rotating said sphere both latitudinally and longitudinally;
   B) transmitting signals from issuing means mounted on said user for tracking the movement of said user within said sphere; and
   C) receiving information transmitted by said signal issuing means mounted on said user by a geo-positioning treading sphere operating system located outside of said sphere;
   D) processing said information by said operating system; and
   E) transmitting the processed information to said pylons for rotating said sphere for maintaining said user standing on the bottom of said sphere as the sphere is rotated.

* * * * *